(12) United States Patent  
Adsit et al.

(10) Patent No.: US 6,224,138 B1
(45) Date of Patent: May 1, 2001

(54) VEHICLE BED TRUNK COMPARTMENT (75) Inventors: Daniel Mark Adsit; Milton D Wong, both of Ann Arbor; Michael D. Yaroch, Livonia, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/149,226

(22) Filed: Sep. 8, 1998

(51) Int. Cl.[7] ............................................. B60P 7/02
(52) U.S. Cl. .......................... 296/100.05; 296/100.03; 296/37.6; 224/404
(58) Field of Search ................ 296/100.05, 100.08, 296/100.02, 37.6, 50; 224/403, 404; 292/DIG. 25

(56) References Cited

U.S. PATENT DOCUMENTS

| | | |
|---|---|---|
| 1,946,633 | 2/1934 | Meyer . |
| 3,012,814 | 12/1961 | Penner . |
| 3,146,824 | 9/1964 | Veilleux . |
| 3,245,713 | 4/1966 | Ogilvie . |
| 4,124,247 | 11/1978 | Penner . |
| 4,126,349 | 11/1978 | Nelson et al. . |
| 4,135,761 * | 1/1979 | Ward ..................................... 296/37.6 |
| 4,252,362 | 2/1981 | Cambell . |
| 4,266,816 * | 5/1981 | Mukai et al. ......................... 292/129 |
| 4,313,636 | 2/1982 | Deeds . |
| 4,372,601 * | 2/1983 | Smith ..................................... 296/50 |
| 4,563,034 | 1/1986 | Lamb . |
| 4,632,446 | 12/1986 | Douglas . |
| 4,733,898 | 3/1988 | Williams . |
| 4,750,773 * | 6/1988 | Chapline et al. .................... 296/37.6 |
| 4,786,099 | 11/1988 | Mount . |
| 4,795,206 | 1/1989 | Adams . |
| 4,828,312 * | 5/1989 | Kinkel et al. ........................ 296/37.6 |
| 4,861,096 | 8/1989 | Hastings . |
| 4,917,430 * | 4/1990 | Lawrence ............................. 296/37.6 |
| 4,930,836 | 6/1990 | Grinn . |
| 4,974,898 * | 12/1990 | Baranski ........................... 296/100.03 |
| 5,127,701 | 7/1992 | Miller . |
| 5,147,103 * | 9/1992 | Ducote ................................ 296/37.6 |
| 5,183,309 | 2/1993 | Jordan . |
| 5,188,414 | 2/1993 | Burnham et al. . |
| 5,201,561 * | 4/1993 | Brown ............................. 296/37.6 X |
| 5,251,950 | 10/1993 | Bernardo . |
| 5,267,773 | 12/1993 | Kalis, Jr. et al. . |
| 5,316,358 * | 5/1994 | Payne et al. ......................... 296/37.6 |
| 5,350,213 | 9/1994 | Bernardo . |
| 5,421,645 | 6/1995 | Young . |
| 5,564,776 | 10/1996 | Schlachter . |
| 5,615,922 * | 4/1997 | Blanchard ............................ 296/37.6 |
| 5,743,589 | 4/1998 | Felker . |
| 5,819,390 * | 10/1998 | Clare ............................. 296/37.6 X |
| 5,853,116 * | 12/1998 | Schreiner ............................. 224/404 |
| 5,988,728 * | 11/1999 | Lund et al. ..................... 296/100.03 |
| 6,126,225 * | 11/1999 | Griffin ............................. 296/100.02 |

\* cited by examiner

Primary Examiner—D. Glenn Dayoan
Assistant Examiner—Jason Morrow
(74) Attorney, Agent, or Firm—Ford Global Technologies, Inc.

(57) ABSTRACT

The cargo space of a vehicle bed has a trunk portion, protected from the environment, created therein by cooperation of a removable intersection bed cover, and a movable rear trunk panel on an underside of the bed cover. The vehicle trunk can be accessed through side doors within the sides of the vehicle bed.

19 Claims, 13 Drawing Sheets

VEHICLE BED TRUNK COMPARTMENT

FIELD OF THE INVENTION

The present invention relates to vehicles with cargo beds, and, more particularly, to a novel structure which provides an easily accessible enclosed space within a vehicle bed.

BACKGROUND OF THE INVENTION

Vehicle bed covers are commonly used to cover cargo areas that are substantially exposed. Such covers are meant to protect cargo in the vehicle bed from the elements. Vehicle bed covers are also often used to provide a measure of security against theft of cargo stored in the vehicle bed. Prior art vehicle bed covers have typically been made of canvas, plastic, or similar materials, and are attached to the vehicle bed by snaps, hooks, ropes or the like.

Though they typically provide reasonable protection from the elements, prior vehicle bed covers provide little security, are difficult to attach and remove, and are difficult to store when not in use. Some vehicle bed covers, especially those which attempt to enhance the security of the vehicle bed, also hinder the operator's access to any cargo stored in the vehicle bed. In order to retrieve such cargo, the operator must remove the cover which is often a laborious and time consuming process.

A number of vehicle bed covers have been proposed in the past. For example, U.S. Pat. No. 4,252,362 (Campbell) teaches manually operating a reel to feed a truck body cover along tracks. In U.S. Pat. No. 5,251,950 (Bernardo), a pickup cover is formed by slats as opposite sides of the cover slide in guide tracks. In U.S. Pat. No. 4,786,099 (Mount) as well as U.S. Pat. No. 4,795,206 (Adams), a motor is further employed to position a truck bed cover. These patents, however, have various complications and disadvantages, such as difficulty in assembling and disassembling the devices, the space taken up by storage of the devices when not in use, and the limited durability of the devices, and therefore have restricted usage.

Other structures have attempted to provide additional access to the vehicle bed. For example U.S. Pat. No. 4,861,096 (Hastings), discloses a vertically hinged passenger door in the side panel of a vehicle, and a port for filling the fuel tank which is accessible by opening the hinged door. In U.S. Pat. No. 4,733,898 (Williams), as well as in U.S. Pat. No. 5,267,773 (Kalis, Jr. et al.), hinged doors provide access to individual compartments formed within a truck bed. These patents, however, have various complications and disadvantages, such as a lack of structural stability, and difficulty of use.

It would be desirable to provide a vehicle bed with means for temporarily covering or enclosing a portion or all of the cargo located within the vehicle bed. Additionally it would be desirable to make the enclosed area of the vehicle bed easily accessible to the operator while maintaining the enhanced security which covering the vehicle bed provides. Further it would be desirable to make a portion of the vehicle bed dustproof as well as waterproof.

SUMMARY OF THE INVENTION

A novel vehicle bed for an automotive vehicle bounded by a flatbed and two side walls is provided. The flatbed is generally horizontal and is bounded by a pair of opposed side walls on transversely opposite sides of the flatbed. The vehicle bed also includes a bed cover for covering at least a portion of the vehicle bed. The vehicle bed further includes a trunk panel. The trunk panel is able to move between a flat position parallel to the bed cover, and a generally vertical upright position. When the trunk panel is in the upright position, it cooperates with the bed cover, two side walls, and a front wall of the vehicle bed to form an enclosed trunk portion in the vehicle bed. The trunk portion is not only waterproof but also dustproof, and provides security for its cargo. The vehicle bed additionally includes at least one trunk door in one of the side walls which opens to allow access to the enclosed trunk portion.

An advantage of the present invention is that the available cargo space of the vehicle bed or a portion thereof is able to be enclosed.

Another advantage of the present invention is that the assembly of the vehicle bed cover is simple.

Yet another advantage of the present invention is that it allows the operator of the vehicle to access the enclosed cargo space of the vehicle bed easily.

Still another advantage of the present invention is that the security of the cargo located in the vehicle bed is enhanced.

Still yet another advantage of the present invention is that a portion of the vehicle bed can be made to be dustproof, while the entire vehicle bed can be made to be waterproof.

BRIEF DESCRIPTION OF THE DRAWINGS

The invention will now be described, by way of example, with reference to the accompanying drawings, in which:

FIG. 8a is a cross-sectional view of the section indicated in FIG. 8 by the line labeled 8a—8a;

DETAILED DESCRIPTION OF THE PREFERRED EMBODIMENT

Figure 1:
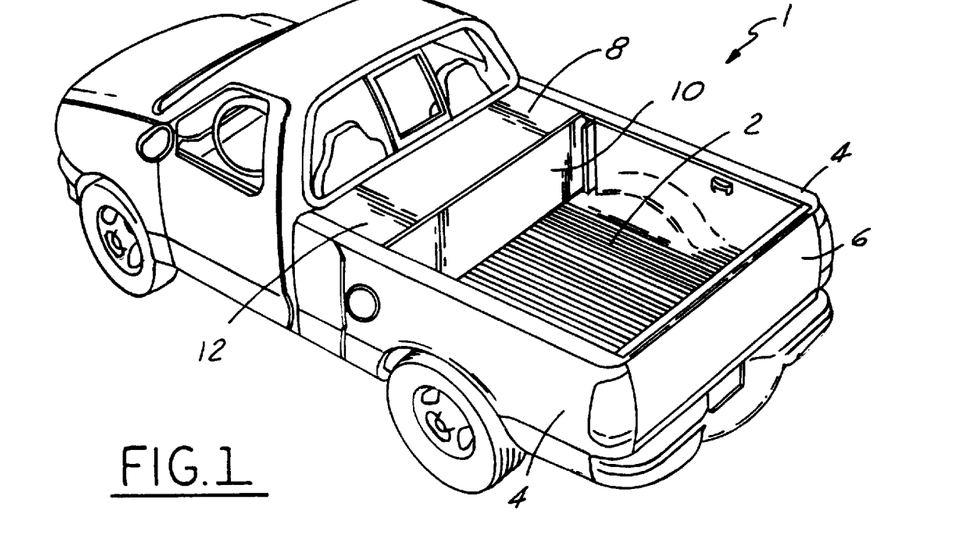
FIG. 1 is an elevational view of a vehicle with a bed according to the present invention, in which the front portion of the vehicle bed is enclosed.
Figure 2:
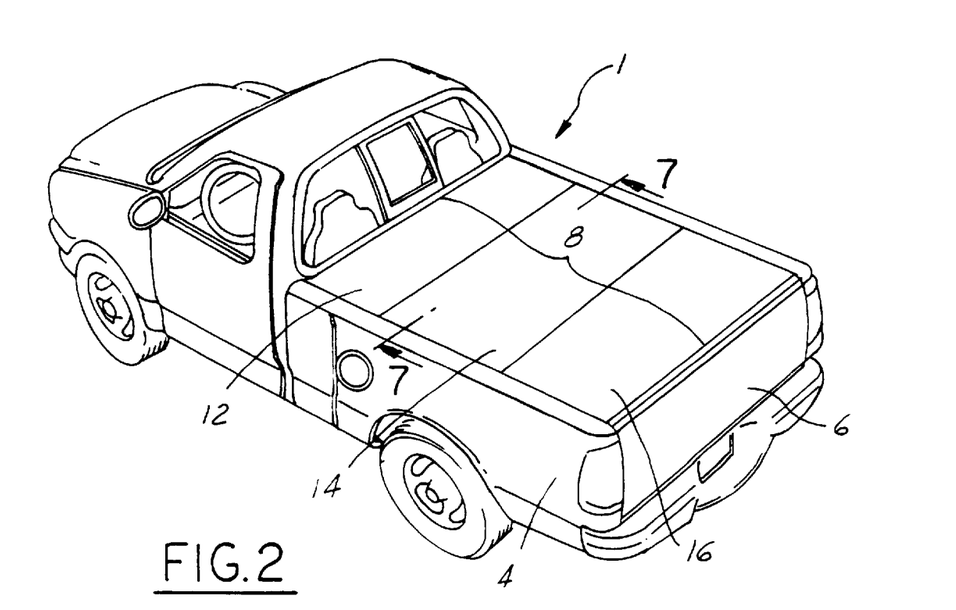
FIG. 2 is an elevational view of a vehicle with a bed according to the present invention, in which the entire vehicle bed is covered.

Referring now to FIGS. 1 and 2, a vehicle bed 1 of the present invention includes a generally horizontal, longitudinally extending flatbed 2 bounded by a pair of opposed side walls 4 on transversely opposite sides of the flatbed 2, and a tailgate 6 rotatably disposed on a rear of the flatbed 2 to allow access to an interior of the vehicle bed by moving from a generally vertical latched position to a rearwardly projecting generally horizontal unlatched position. The side walls and tailgate define boundaries of the vehicle bed when the tailgate is in the latched position.

Figure 3:
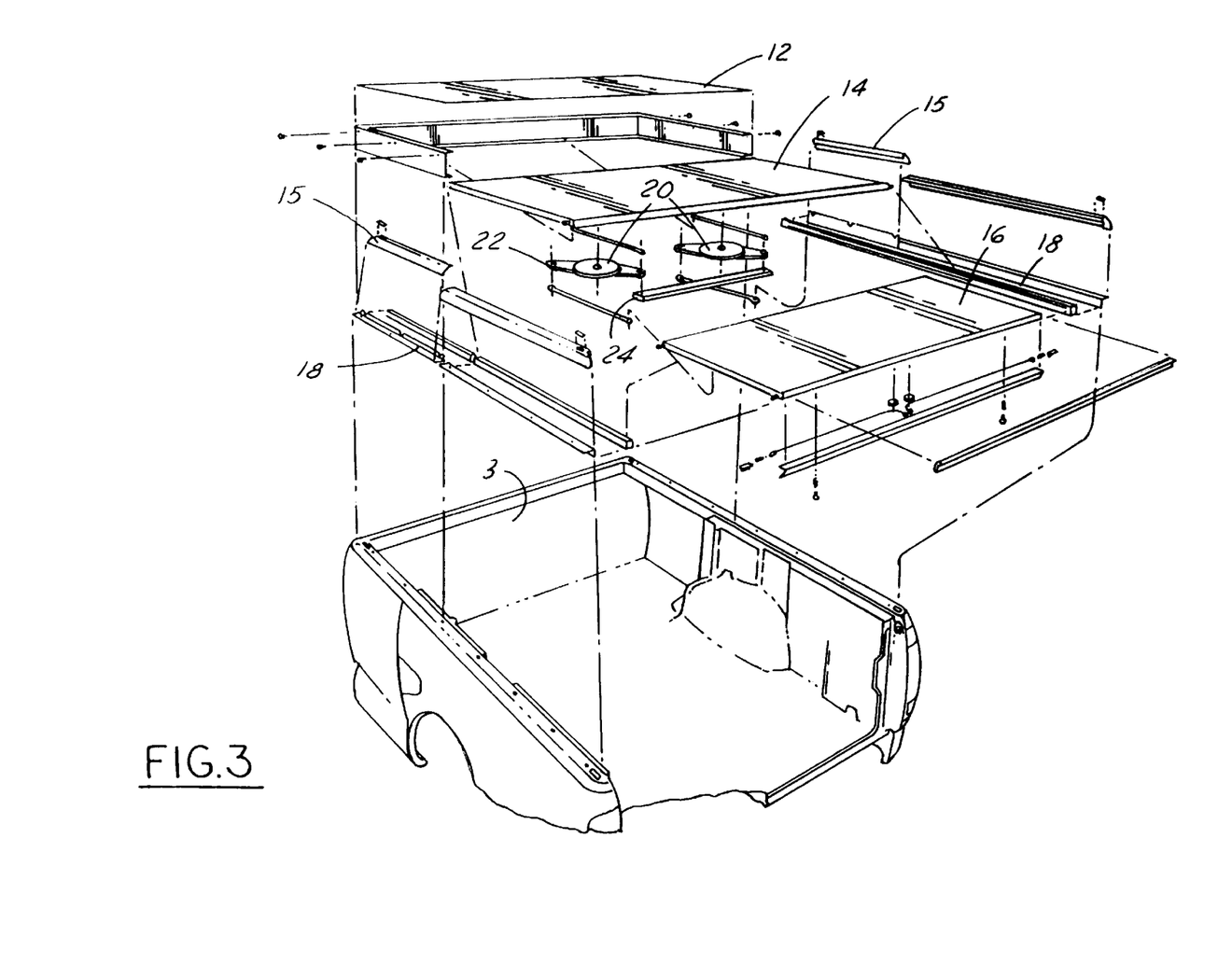
FIG. 3 is an exploded perspective view of a bed cover assembly according to the present invention.
Figure 5:
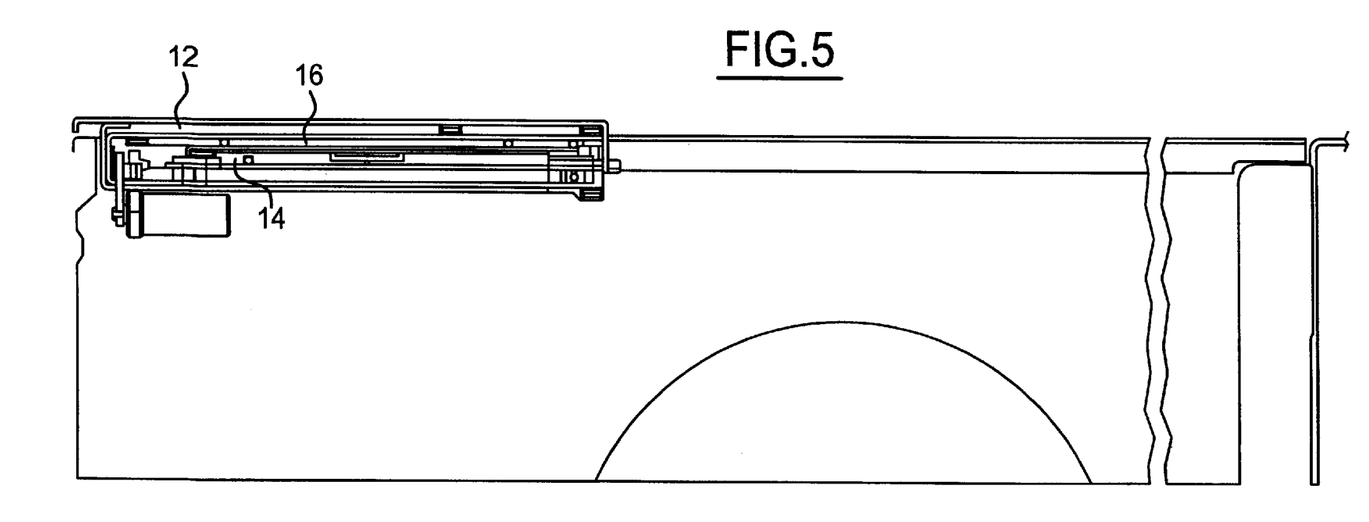
FIG. 5 is a side view of the bed cover in an extended position.

To provide an enclosable environmentally protected trunk space within the above described vehicle bed 1, the present invention includes bed cover 8, and trunk panel 10. Bed cover 8 is composed of three distinct sections, a forward section 12, a middle section 14, and an aft section 16, as best seen in FIG. 3. When in a retracted position, as seen in FIGS. 1 and 5, the sections of bed cover 8 lie stacked vertically upon one another, covering only a forward section of vehicle bed 1. When in the retracted position, bed cover 8 can be completely removed from the vehicle, after removing the front track covers 15, shown in FIG. 3, from side walls 4. When in an extended position, the three sections 12, 14, 16 of bed cover 8 lie parallel and adjacent to one another, collectively extending from the rear of the vehicle cab to tailgate 6, thus covering the entirety of vehicle bed 1, as seen in FIG. 2.

Figure 4:
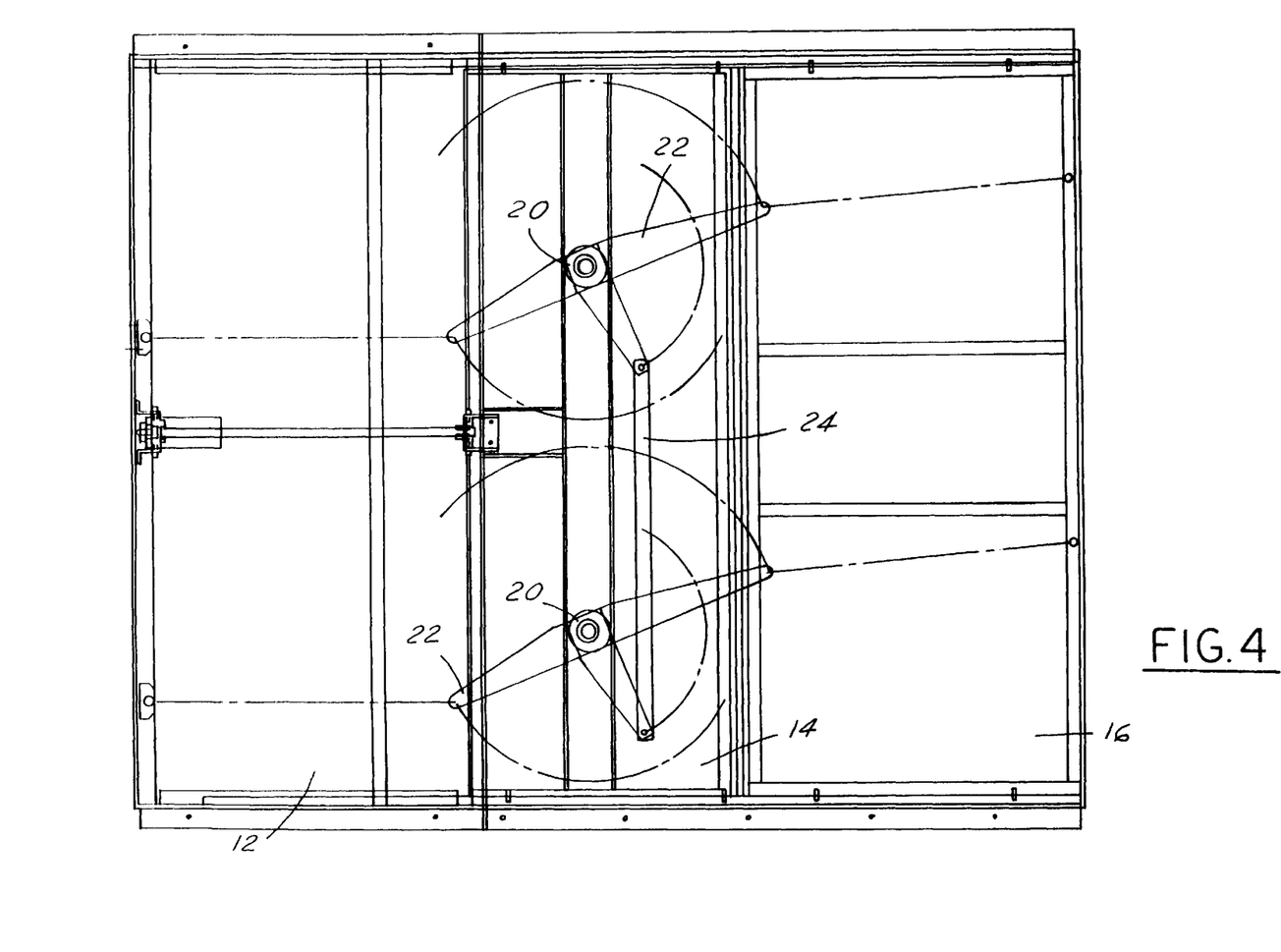
FIG. 4 is a plan view demonstrating a mechanism by which the bed cover is extending and retracting the bed cover of the present invention.

To allow bed cover 8 to move between the retracted and extended positions, the present invention includes tracks 18, as shown in FIG. 3, preferably disposed on side walls 4, in which the middle section 14 and aft sections 16 of bed cover 8 slide. Additionally, a pair of slide governors 20 are provided, rotatably disposed on the middle portion of the bed cover 14. As shown in FIG. 4, each slide governor 20 possesses three flanges 22 radiating from the slide governor's axis of rotation. Two of the flanges 22 of each slide governor 20 are connected to the forward section 12 or aft section 16, respectively of bed cover 8 by a rod or other rigid connection device. When bed cover 8 is pulled to the extended position, or pushed to the retracted position, slide governors 20, rotate appropriately. To ensure that there is no substantial lateral force perpendicular to the intended direction of movement of bed cover 8 along tracks 18, a slide governor connecting bar 24 is provided. Slide governor connecting bar 24 rigidly connects the flanges 22 of the slide governors 20 which are not connected to the forward 12 or aft 16 sections of bed cover 8, as shown in FIG. 4. By restricting the rotation of slide governors 20 relative to one another, slide governor connecting bar 24 forces slide governors 20 to cooperate with one another, thus allowing only a longitudinal movement of the middle 14 and aft 16 portions of bed cover 8. Those skilled in the art will undoubtedly notice that a motor can be used to rotate slide governors 20, thus automating bed cover 8.

When bed cover 8 is in the retracted position, as seen in FIG. 5, the sections of bed cover 8 lie stacked, parallel to one another. Middle section 14 of bed cover 8 lies underneath both other sections in a stowed position. Aft section 16 of bed cover 8 is positioned between middle section 14 and forward section 12, which is atop the other sections. Once the middle 14 and aft 16 sections of bed cover 8 are stowed in the retracted position, each is releasably held in place to avoid movement, rattling, or sliding during operation of the vehicle.

Figure 6:
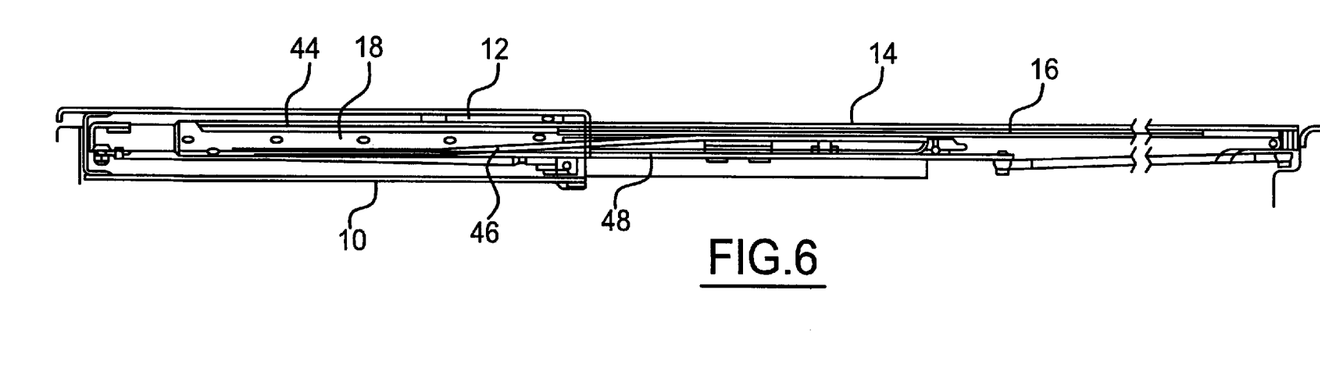
FIG. 6 is a side view of the bed cover in a retracted position.

When bed cover 8 is in the extended position, as shown in FIG. 6, the sections of bed cover 8 lie adjacent to one another extending collectively from the front wall of vehicle bed 1 to tailgate 6. Middle section 14 and aft section 16 are positioned on the same vertical level as one another, while forward section 12 remains slightly higher. This results in a small step between the middle 14 and forward 12 sections of bed cover 8, as is apparent from FIG. 6. The combination of the three sections 12, 14, 16 of bed cover 8, when bed cover 8 is in the extended position, create a waterproof vehicle bed, due to seals disposed along their respective edges, and are flush against one another.

Figure 7:
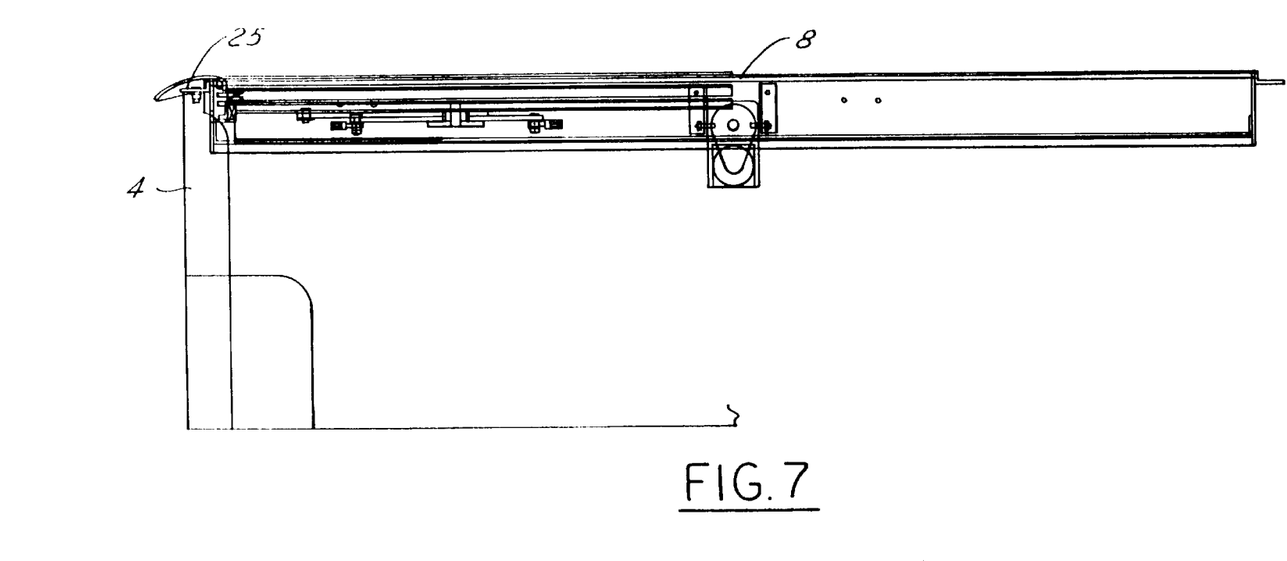
FIG. 7 is an end cross-sectional view taken along line 7—7 of FIG. 2 showing the bed cover and the mechanism which allows it to slide between the retracted and extended positions.

Disposed upon the ededges of bed cover 8 is molding 25, as shown in FIG. 7, which provides a seal between bed cover 8 and the side walls 4 of vehicle bed 1. Molding 25 further insures the protection of cargo from the environment. Molding 25 is removed prior to removal of bed cover 8.

Figure 8:
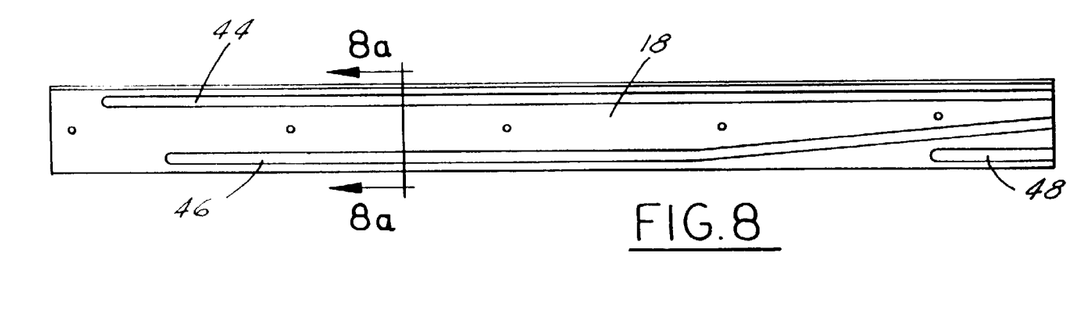
FIG. 8 is an end cross-sectional view of a track on which the bed cover is allowed to slide between positions.
Figure 8A:
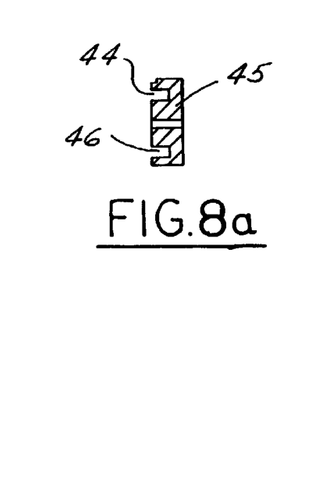

Forward section 12 of bed cover 8 is stationary in the position shown in FIGS. 1 and 2, while middle section 14 and aft section 16 of bed cover 8 are slidable along tracks 18 disposed in side walls 4, when moving between the retracted position and the extended position, as discussed above. Aft section 16 of bed cover 8 slides along top track 44 (FIG. 8) which runs from the front of side wall 4 to tailgate 6. Top track 44 remains generally parallel to flatbed 2 for the entire length thereof, allowing aft section 16 to move longitudinally while remaining at the same vertical level. Two pins or rollers are disposed on each side of aft section 16, and mate with top track 44 in order to guide movement of aft section 16. Middle section 14 of bed cover 8 also has pins or rollers disposed near its corners. The pins or rollers disposed on middle section 14, nearest the front of vehicle bed 1 mate with middle track 46, while the pins or rollers nearest tailgate 6 mate with bottom track 48. As each pin or roller of middle section 14 glides along its respective track 46, 48, as bed cover 8 is being moved from the retracted position to the extended position, middle section 14 rises slightly to a vertical level identical to that of aft section 16, and just below forward section 12. Middle section 14 develops a slight pitch during this process, as is evident by the path of the tracks displayed in FIG. 6. This pitch is ultimately eliminated when middle section 14 reaches its extended position. Middle section 14 and aft section 16 follow a reverse path when traveling from the extended position to the retracted position. FIG. 8a shows one such track design which could be used to accomplish the sliding movement of the bed cover 8 described above. Various other methods for accomplishing this task will undoubtedly occur to those skilled in the art after reading this specification.

Figure 9:
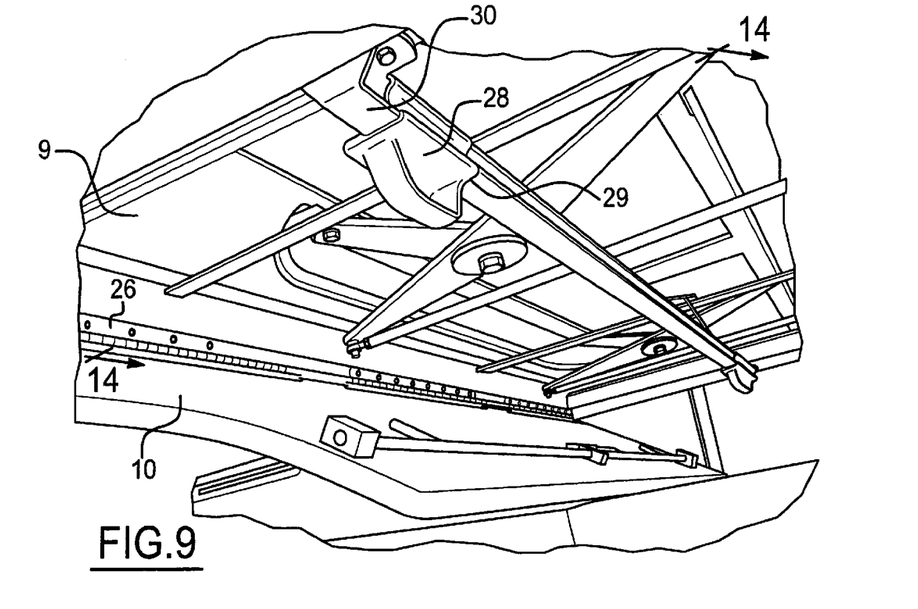
FIG. 9 is a perspective view of an underside of the bed cover with a trunk panel mounted thereon for rotation according to one embodiment of the present invention.
Figure 10:
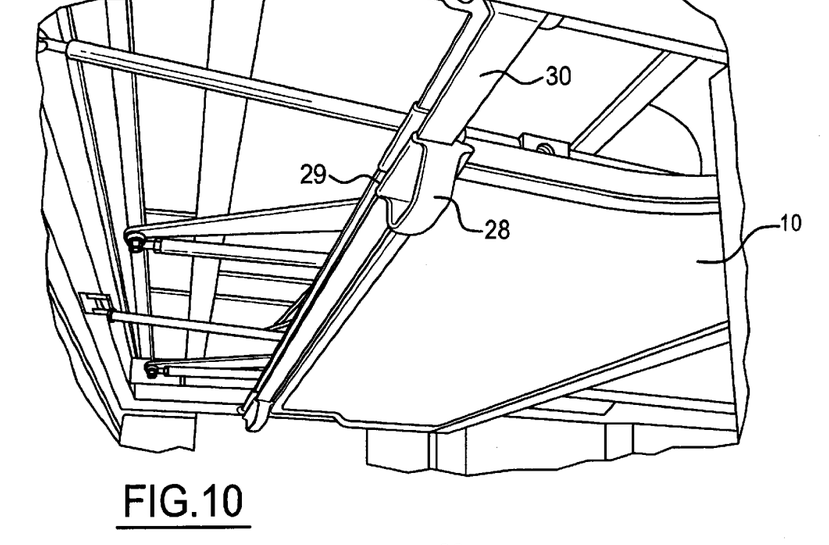
FIG. 10 is a perspective view similar to FIG. 9 but showing the trunk panel being releasably held by a trunk panel operating mechanism.
Figure 11:
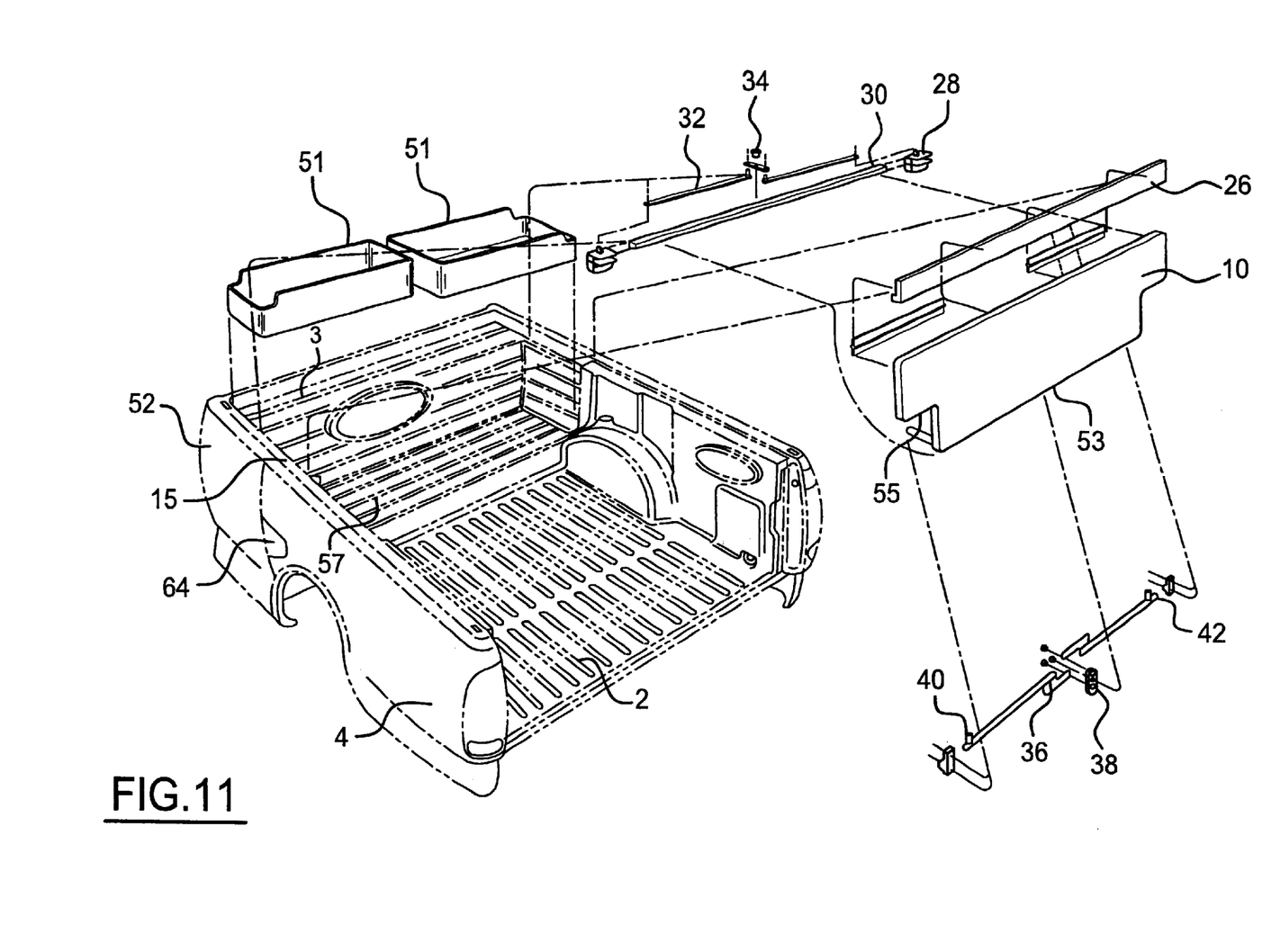
FIG. 11 is an exploded perspective view of a vehicle bed having a trunk panel which bounds an enclosable trunk area.
Figure 14:
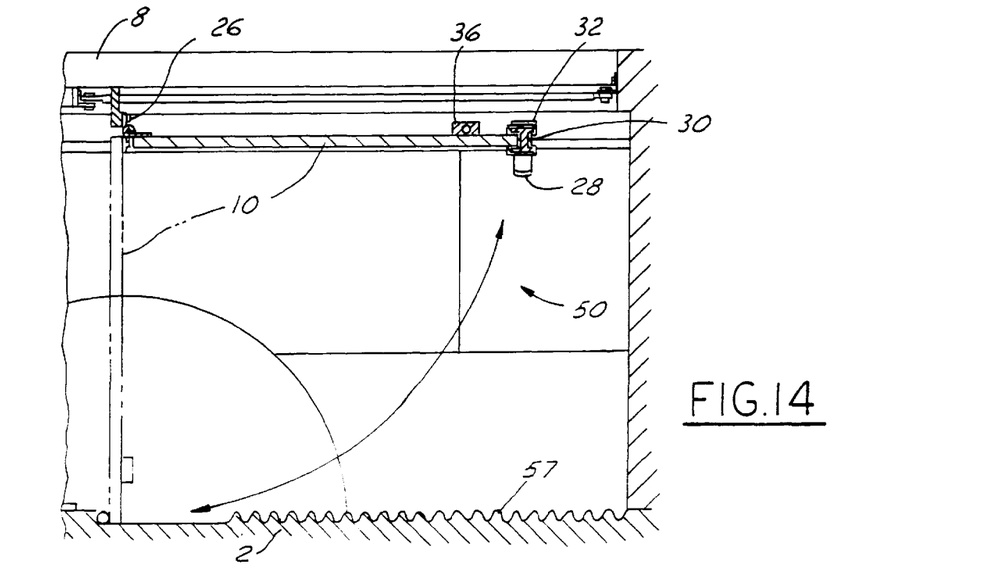
FIG. 14 is a side cross-sectional view of the trunk portion showing rotation of the trunk panel between flat and upright positions.

Turning now to FIG. 9, the trunk panel 10 is rotatably mounted from bracket 26, which is connected to front portion 12 of bed cover 8. Since it is attached to front portion 12, trunk panel 10 is also removed from vehicle bed 1 when bed cover 8 is removed in the manner discussed above. Trunk panel 10 swings between an upright position, generally perpendicular to bed cover 8 and flatbed 2, and a flat position, generally parallel to an underside 9 of bed cover 8. When in the upright position, as seen in FIG. 1, trunk panel 10, along with side walls 4, flatbed 2, and bed cover 8, encloses a watertight dustproof trunk portion 50 of vehicle bed 1. Trunk panel 10 is releasably held in the flat position, as seen in FIG. 10 by a retention mechanism 29 which includes a set of grab handles 28. Grab handles 28 include grooves, carved into the side of grab handles 28 nearest tailgate 6. Such grooves receive an upper edge of trunk panel 10 therein allowing grab handles 28 to mate temporarily with trunk panel 10 (FIGS. 11 & 14). By moving grab handles 28 away from one another, along panel retaining beam 30, trunk panel 10 can be released, allowing it to swing about bracket 26. Conversely, trunk panel 10 can be affixed to panel retaining beam 30 by movement of the grab handles 28 toward one another.

Figure 12:
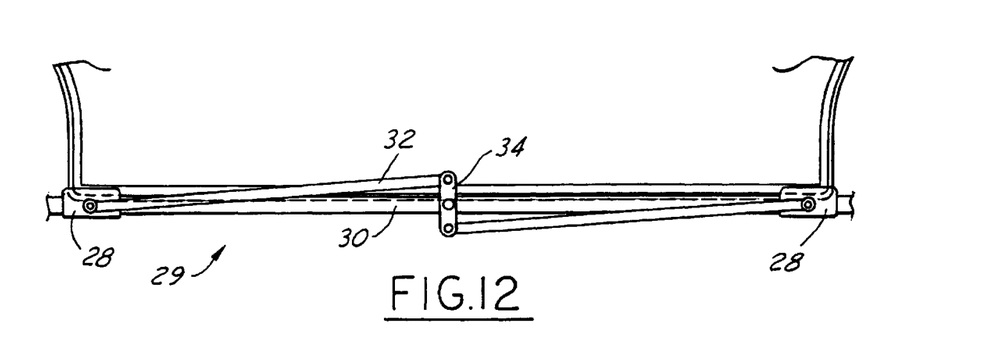
FIG. 12 is a plan view of a trunk panel lock mechanism which releasably holds the trunk panel shown in a position locking the trunk panel in a position generally parallel to the bed c over.
Figure 13:
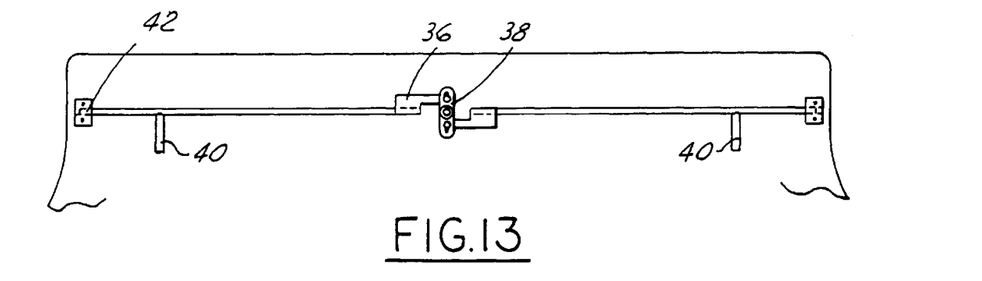
FIG. 13 is a plan view of the trunk panel lock mechanism shown locking the trunk panel in an upright position.

FIGS. 12 and 13 show the mechanisms by which trunk panel 10 is held in and released from the flat position and the upright position, respectively. Once swung into the flat position, trunk panel 10 can be secured by the operation of flat position latch 32. By rotation of flat position latch communicator 34, flat position latch 32 coordinates the movements of grab handles 28, as is apparent by the connection means depicted in FIGS. 11 and 12. When flat position latch 32 is in the position shown in FIG. 12, grab handles 28 impede the movement of trunk panel 10, keeping trunk panel 10 in the flat position. When one of grab handles 28 is pulled outward, in a direction generally away from the other handle, the other handle is moved outward by the action of flat position latch 32, thus removing all impedence to the swinging of trunk panel 10. Conversely, when one of grab handles 28 is moved inward, in a direction generally toward the other handle, the other handle is also moved inward by the action of flat position latch 32, thus temporarily connecting trunk panel 10 to panel retaining beam 30.

Similarly, upright position latch 36 secures trunk panel 10 in the upright position (FIGS. 11 and 13). By rotation of upright position latch communicator 38, flat position latch 36 coordinates the movements of upright position latch pins 42, as is apparent by the connection means depicted in FIG. 13. When upright position latch 36 is in the position shown in FIG. 12, upright position latch does not impede the movement of trunk panel 10. When one of upright position latch handles 40 is pulled outward, in a direction generally away from the other handle, the other handle is moved outward by the action of upright position latch 36. If such an action is performed when trunk panel 10 is in the upright position, upright position latch pins 42 are inserted into mating components provided on side walls 4, thus holding trunk panel 10 in the upright position, and consequently creating a trunk portion 50, as discussed above. Conversely, when one of the upright position latch handles 40 is moved inward, in a direction generally toward the other handle, the other handle is also moved inward by the action of upright position latch 36, thus allowing trunk panel 10 to again swing freely.

Figure 20:
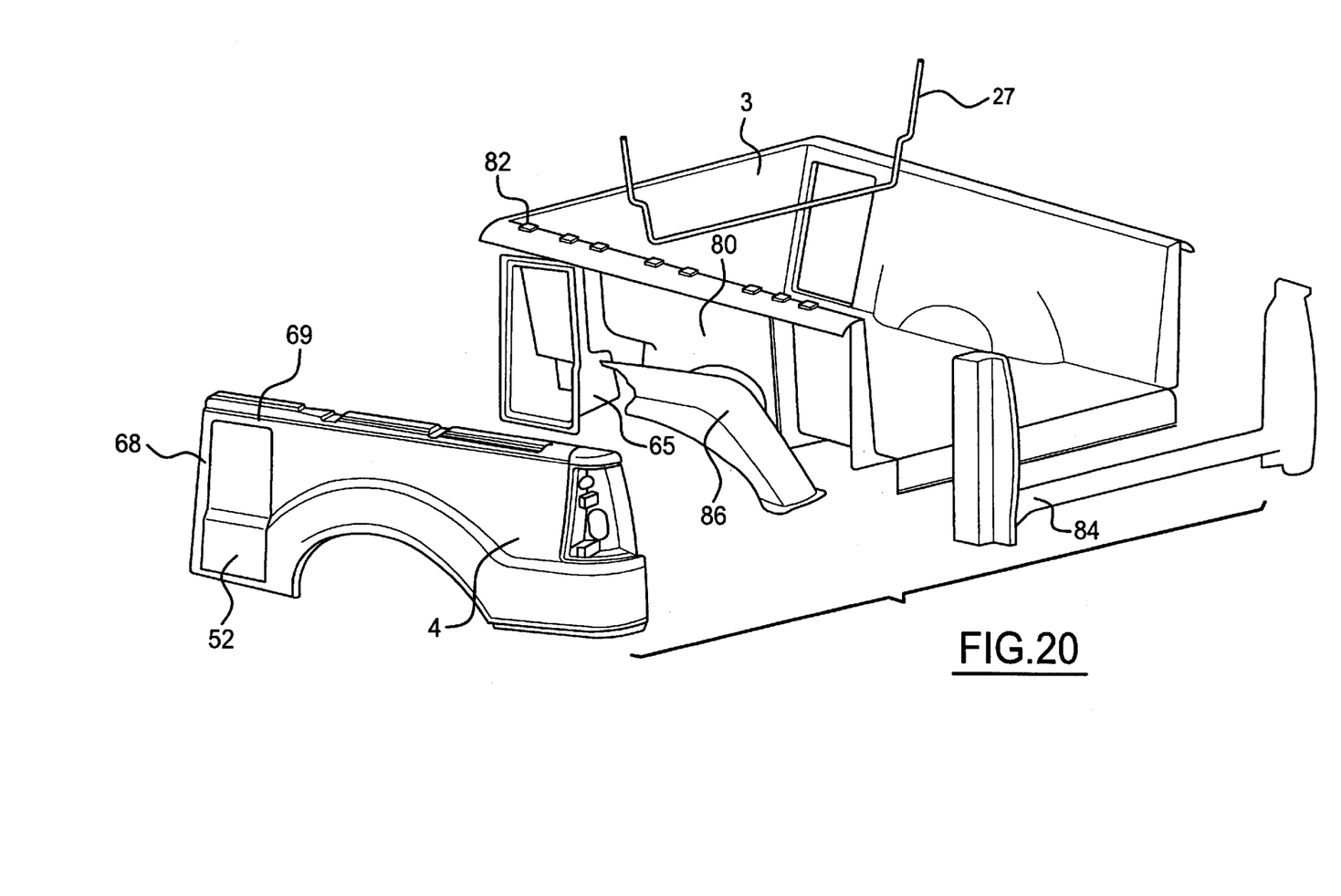
FIG. 20 is an exploded perspective view of an alternative truck bed construction according to the present invention.

When removable trunk panel 10 is swung to the upright position and subsequently latched into place, an enclosed trunk portion 50 is formed within vehicle bed 1. Trunk portion 50 is entirely enclosed, and isolated from the environment therearound including the unenclosed portion or remainder of vehicle bed 1. Trunk portion 50 is not only waterproof, but is also dustproof, and thus provides cargo therein with excellent protection from damage. Trunk portion 50 is made waterproof and dustproof by trunk panel 10 being flush against flatbed 2, as seen in FIG. 14, as well as against side walls 4. This tight contact between the boundaries of vehicle bed 1 and trunk panel 10 is insured through the use of a seal 27, as depicted in FIG. 20, disposed around the free edge 53 and sides 55 of trunk panel 10. The portion of vehicle bed 2 which bounds trunk portion 50 is further corrugated to provide a guiding surface for trunk trays 51 to slide upon, as shown in FIG. 11. Trunk trays 51 provide a convenient manner in which to store and access cargo in trunk portion 50. The trays 51 have a corrugated bottom surface which mate with trunk portion 50 floor corrugations 57 (FIG. 14) which preferably run laterally across the trunk portion 50.

Figure 15:
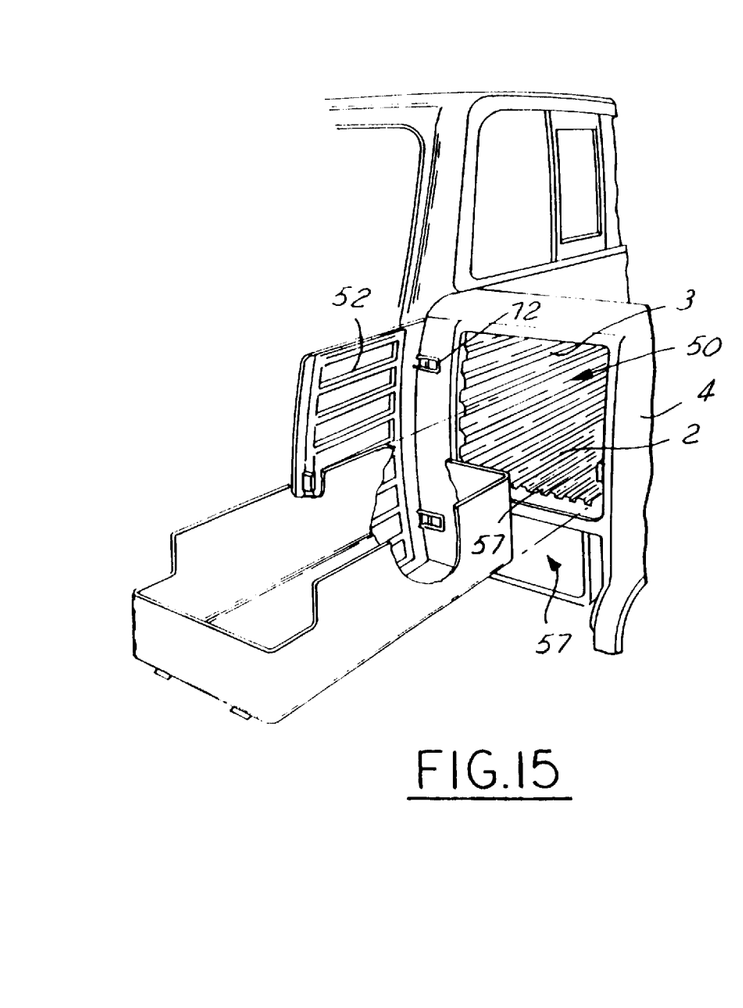
FIG. 15 is a perspective view of the enclosable trunk portion of the present invention, as seen with a trunk door in an open position.
Figure 16:
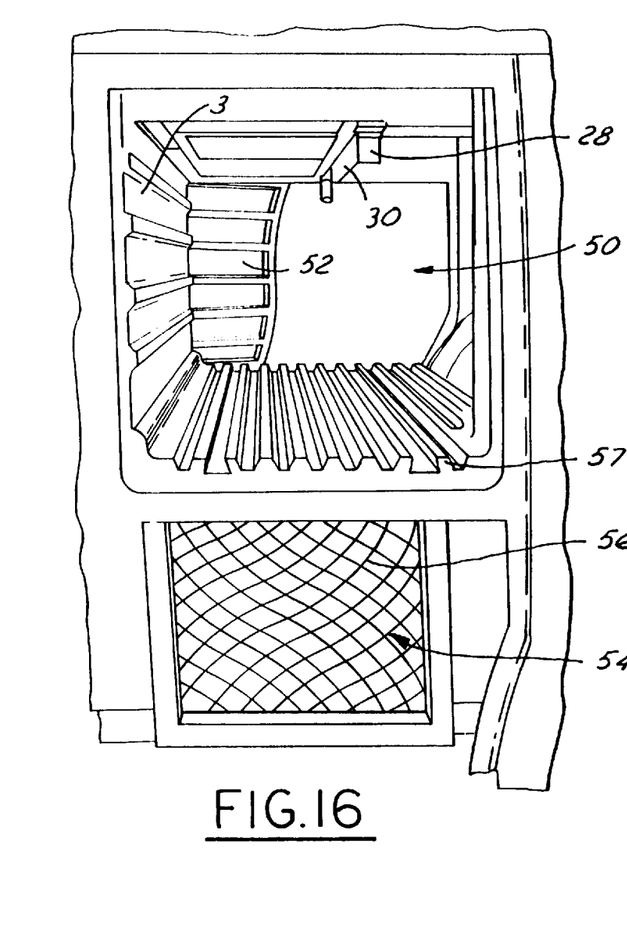
FIG. 16 is a side view of the enclosable trunk portion of the present invention.

To permit convenient access to the trunk portion 50, and cargo therein, trunk doors 52 are provided in each of the side walls 4 (FIG. 15). Trunk doors 52 are advantageously vertically hinged near the front of side walls 4 adjacent the vehicle cab. It is important to locate the hinge wall of doors 52 on or near the forward wall 3 of the vehicle bed 1 so that the latches do not interact with the front wall 3 where torsional effects are more pronounced than intermediate the front wall 3 and tailgate 6. Each trunk door 52 also provides access to a bottom mounted storage compartment 54, located underneath trunk portion 50. Each bottom mounted storage compartment 54 can carry additional cargo which can be secured by a removable cargo net 56 or the like, as shown in FIG. 16. Trunk doors 52 latch in a closed position, enclosing trunk portion 50 and concealing its contents. Door latching means 70 such as those shown in FIG. 17 may be used.

Figure 17:
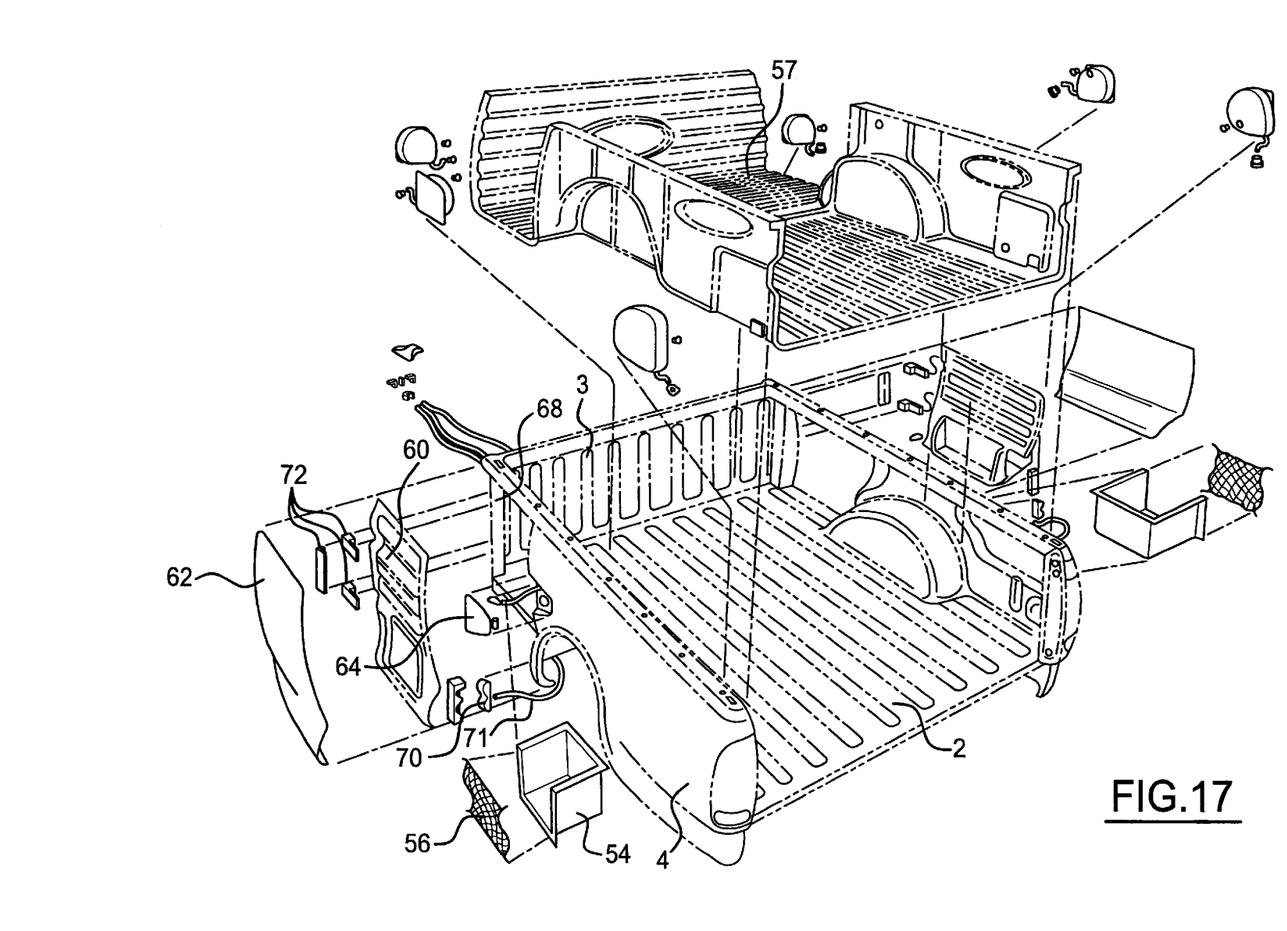
FIG. 17 is an exploded perspective view of a vehicle bed construction according to one embodiment of the present invention with side doors for making the trunk portion accessible exteriorly of the vehicle bed.
Figure 21:
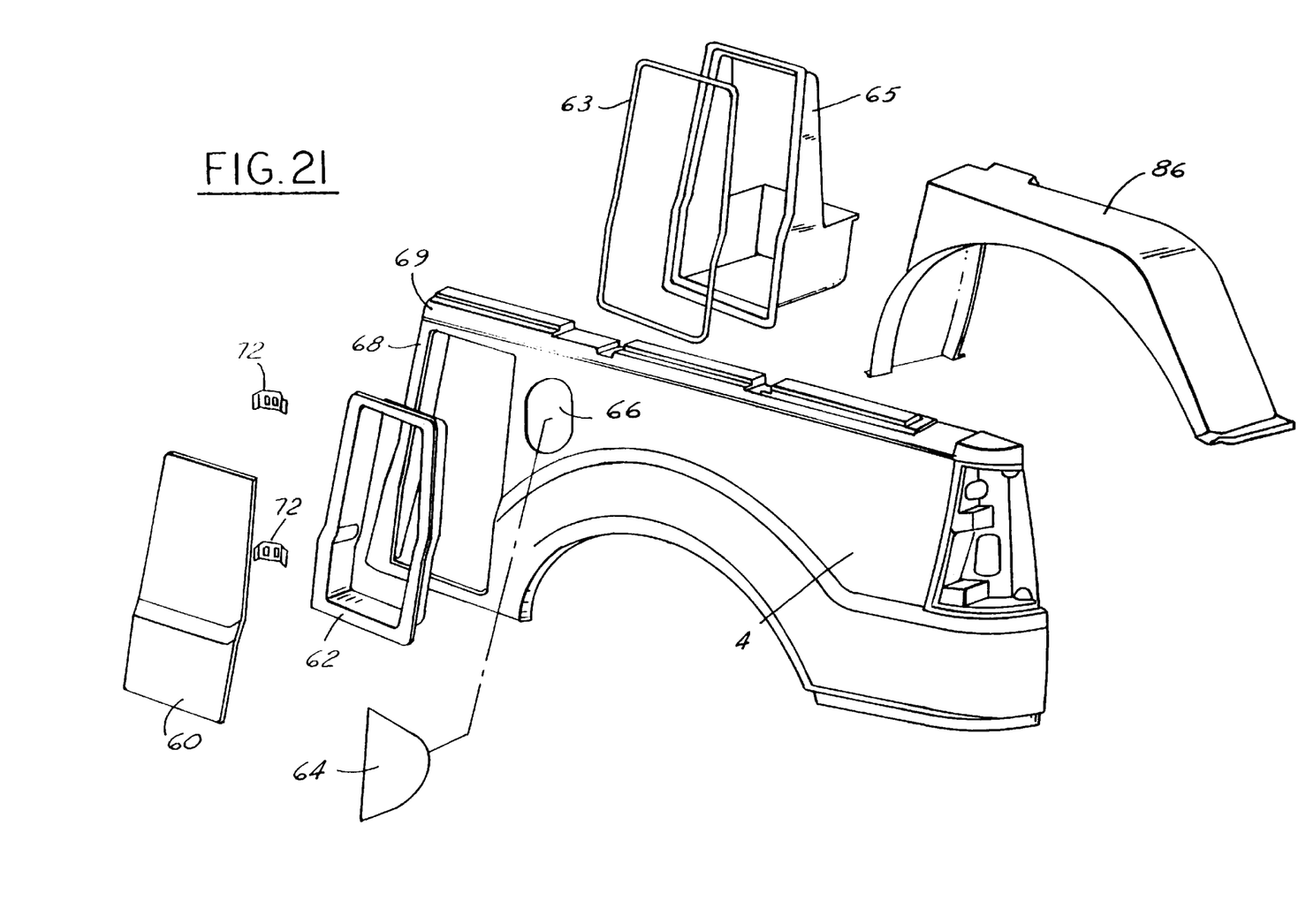
FIG. 21 is an exploded perspective view of a trunk door and side wall according to an alternate embodiment of the present invention.

As shown in FIGS. 17 and 21, each trunk door 52 preferably consists of an inner piece 60, and an outer piece 62. Each outer piece 62 is a solid panel, while each inner piece 60 serves as a structural frame for trunk door 52. To insure the waterproof and dustproof nature of trunk portion 50, a trunk door seal 63 is provided, which allows a water tight interface between side wall 4, trunk door 52, and trunk box 65. Adjacent to one of the trunk doors 52 is fuel port cover 64, which conceals fuel port 66. Outer piece 62 is bolted to inner piece 60, which is vertically hinged to side wall 4. Through this attachment by hinges 72, as well as side door latch 70 when in the closed position, trunk door 52 is mounted on frame 68 formed from side wall 4. It is important that frame 68 is continuous on all edges of closed trunk door 52, including the upper edge 69, in order to provide structural stability. If frame 68 were not continuous, the torsional stresses which would occur during vehicle operation may damage side walls 4, trunk doors 52, or latches 70 and hinges 72.

Figure 18:
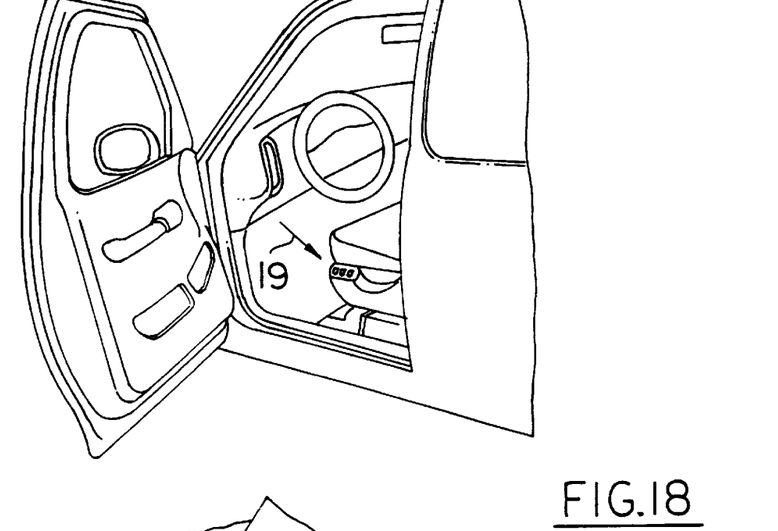
FIG. 18 is a perspective view of a cab portion of a vehicle having a cargo bed which may be covered and divided by the present invention.
Figure 19:
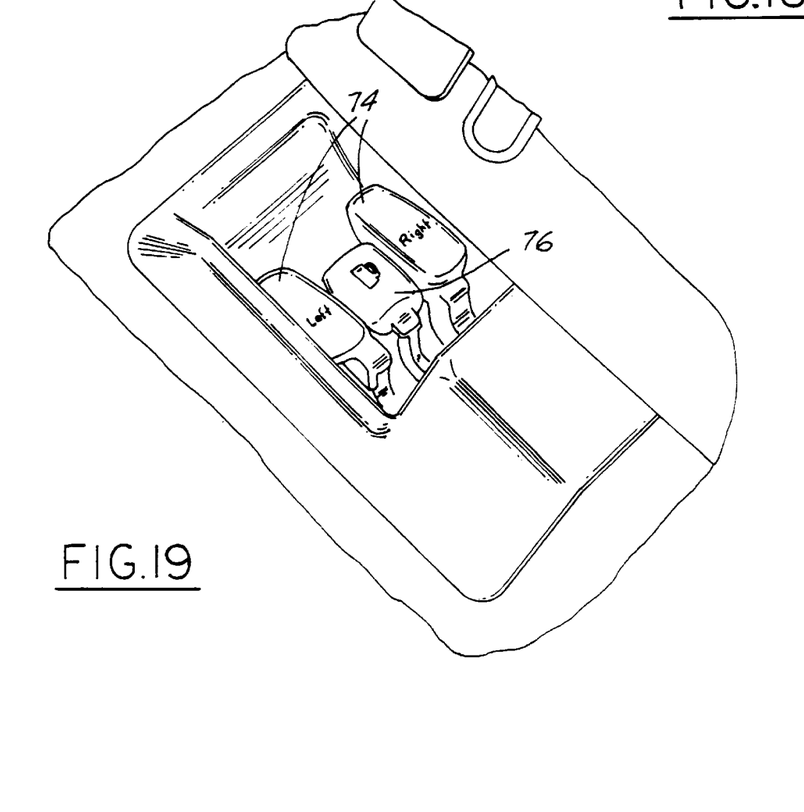
FIG. 19 is a perspective view of the trunk door controls from the direction pointed to by the arrow labeled 19 in FIG. 18.

To conveniently control opening of the trunk doors 52 from within the vehicle cab, trunk door controls 74 are also provided near one side of the driver's seat, as shown in FIG. 18. By pulling one of the trunk door controls 74 in a generally upward fashion, the operator can open the corresponding trunk door 52. In a preferred embodiment of the present invention, trunk door controls 74 are disposed near fuel port control lever 76, as shown in FIG. 19. Trunk door controls 74 may open trunk doors 52 by means of a tension cable 71 or the like connected to latch 70 in a manner known in the art.

An alternative embodiment of the present invention is shown in FIG. 20. As seen, the present invention could be produced as an inner box 80 shaped to mate with vehicle bed 1. Inner box 80 could be formed from steel, SMC, or other suitably durable materials. Once formed, inner box 80 can be secured to vehicle bed 1 by bolts 82, as shown in FIG. 20, or by stamping or welding, as is well known in the art. The entire assembly of the present invention is supported by D-pillar reinforcement 84. This alternative embodiment of the present invention, as well as others, must be formed into such a shape as to allow the assembly to fit over wheel house 86, also shown in FIG. 21. Such an alternative embodiment of the present invention, as described above, might reduce costs in manufacturing a vehicle bed according to the present invention.

Variations and modifications to the present invention will, no doubt, occur to those skilled in the art. The present invention has been described with reference to a pick-up truck. However, the same principles can be applied to other vehicles having defined cargo spaces or the like. It is the following claims, including all equivalents, which define the scope of our invention.

What is claimed is:

1. A vehicle bed for an automotive vehicle comprising, in combination:
   a generally horizontal, longitudinally extending flatbed having a tailgate and being bounded by a pair of opposed side walls on transversely opposite sides of the flatbed, defining lateral boundaries of the vehicle;
   a pair of longitudinally extending tracks which are operatively disposed in the pair of opposed side walls;
   a bed cover which is slidably coupled to the pair of longitudinally extending tracks between the pair of opposed side walls and which selectively covers at least a forward portion of the vehicle bed;
   a trunk panel mounted to said bed cover and locatable in a generally vertical upright position extending between the side walls and cooperating with the bed cover, the flatbed, a front wall of the vehicle bed, and the side walls to form an enclosed trunk portion in the vehicle bed; and
   at least one trunk door in one of the pair of side walls openable to allow access to the enclosed trunk portion.

2. A vehicle bed as recited in claim 1 wherein the trunk panel is rotatable between a stowed position generally parallel to an underside of the top cover and the upright position.

3. A vehicle bed as recited in claim 2 including latch means for latching the trunk panel in the upright and stowed positions.

4. A vehicle bed as recited in claim 2 wherein the bed cover has a plurality of telescoping members movable between a retracted position covering the trunk portion, and a fully extended position covering the entire vehicle bed.

5. A vehicle bed as recited in claim 1 wherein the bed cover and the trunk panel are removable from the vehicle bed.

6. A vehicle bed as recited in claim 1 including at least one storage compartment attached to the vehicle bed beneath the trunk portion adjacent the at least one trunk door so as to be covered when the at least one trunk door is in a closed position and accessible when the at least one trunk door is in an open position.

7. A vehicle bed as recited in claim 1 wherein the at least one trunk door includes at least one latch which is remotely operable by latch operation means located in a cab of the vehicle for latching and unlatching the at least one trunk door.

8. A vehicle bed for an automotive vehicle having a generally horizontal, longitudinally extending flatbed having a tailgate and being bounded by a pair of opposed side walls on transversely opposite sides of the flatbed, defining lateral boundaries of the vehicle bed, the vehicle bed comprising:
   a pair of longitudinally extending tracks which are operatively disposed in the pair of opposed side walls;
   a removable bed cover which is slidably coupled to the pair of longitudinally extending tracks between the pair of opposed side walls and which selectively covers at least a portion of the vehicle bed;
   a trunk panel which is removable attached to said vehicle bed and which is rotatable between a stowed position generally parallel to an underside of the top cover and an upright position extending between the side walls, the trunk panel cooperating with the bed cover, the flat bed side walls to form an enclosed, transversely extending trunk portion in the vehicle bed; and
   a pair of trunk doors on opposite sides of the trunk portion adapted for location in each of the pair of side walls and movable between an open position to allow access to the trunk portion and a closed position blocking access to the trunk portion.

9. A vehicle bed as recited in claim 8 including latch means for latching the trunk panel in the upright and stowed positions.

10. A vehicle bed as recited in claim 8 wherein the bed cover has three telescoping members movable between a retracted position covering the trunk portion, and a fully extended position covering the entire vehicle bed.

11. A vehicle bed as recited in claim 8 including trunk panel operation means for moving the trunk panel between the stowed and upright positions.

12. A vehicle bed as recited in claim 11 wherein the trunk panel operation means is located below the bed cover adjacent one of the pair of trunk doors.

13. A vehicle bed as recited in claim 11 wherein the trunk panel operation means comprises at least one grab handle, which receives an edge of said trunk panel, located below the bed cover adjacent one of the pair of trunk doors, the grab handle connectable to a panel retaining beam.

14. A vehicle bed as recited in claim 8 including at least one storage compartment attached to the vehicle bed beneath the trunk portion adjacent the at least one trunk door so as to be covered when the at least one trunk door is in a closed position and accessible when the at least one trunk door is in an open position.

15. A vehicle bed as recited in claim 8 wherein the at least one trunk door includes at least one latch which is remotely operable by latch operation means located in a cab of the vehicle for latching and unlatching the pair of trunk doors.

16. A vehicle bed as recited in claim 8 including at least one cargo tray mounted in the trunk portion for slidable transverse movement out of an opening in one of the side walls when one of the pair of doors is in the open position.

17. A vehicle bed cover for an automotive vehicle having a generally horizontal, longitudinally extending flatbed bounded by a pair of opposed side walls on transversely opposite sides of the flatbed defining lateral boundaries of a vehicle bed, the vehicle bed cover comprising:

a pair of longitudinally extending tracks which are operatively disposed in the pair of opposed side walls;

a removable bed cover which is slidably coupled to the pair of longitudinally extending tracks between the pair of opposed side walls and which selectively covers at least a forward portion of the vehicle bed;

a trunk panel attached to the bed cover for movement between a stowed position generally parallel to an underside of the top cover and an upright position extending between the side walls, the trunk panel cooperating with the bed cover, the flatbed, a front wall of the vehicle bed, and the side walls to form an enclosed, transversely extending trunk portion in the vehicle bed; and trunk panel operation means for moving the trunk panel between the stowed and upright positions.

18. A vehicle bed cover as recited in claim 17 wherein the trunk panel operation means is located below the bed cover and accessible from a side of the vehicle.

19. A vehicle bed cover as recited in claim 17 wherein the trunk panel operation means comprises at least one grab handle located below the bed cover adjacent a side of the vehicle, the grab handle connectable to a panel retaining beam.

* * * * *